United States Patent [19]
Penton

[11] 3,762,556
[45] Oct. 2, 1973

[54] OIL SKIMMING APPARATUS
[75] Inventor: John W. Penton, Sulphur, La.
[73] Assignee: Cities Service Oil Company, Tulsa, Okla.
[22] Filed: May 28, 1971
[21] Appl. No.: 148,065

[52] U.S. Cl............ 210/242, 210/DIG. 21, 210/252
[51] Int. Cl............................................. E02b 15/04
[58] Field of Search .................. 61/25; 210/242, 83, 210/DIG. 21, 169, 252

[56] References Cited
UNITED STATES PATENTS

| 3,630,376 | 12/1971 | Price | 210/242 |
|---|---|---|---|
| 3,555,574 | 1/1971 | Stanwood | 210/169 |
| 3,567,020 | 3/1971 | Whitaker | 210/169 X |
| 3,237,774 | 3/1966 | Schuback | 210/DIG. 21 |
| 3,306,448 | 2/1967 | Baker | 210/169 |
| 3,300,985 | 1/1967 | Humpherys et al. | 61/25 |
| 3,529,720 | 9/1970 | Chablaix | 210/DIG. 21 |
| 2,776,541 | 1/1957 | Fortes | 61/25 |
| 3,066,490 | 12/1962 | Dubouchet | 61/25 |
| 2,826,307 | 3/1958 | Pace | 210/169 |

FOREIGN PATENTS OR APPLICATIONS

| 866,659 | 4/1961 | Great Britain | 210/169 |

Primary Examiner—Samih N. Zaharna
Assistant Examiner—T. A. Granger
Attorney—J. Richard Geaman

[57] ABSTRACT

An oil skimming apparatus comprising a floating housing placed within a body of water, for example a settling pond, having an oil slick thereon. The housing includes multiple, interconnected hinged gates to provide weirs over which the oil slick can spill into an oil sump within the housing. Oil which accumulates within the housing is pumped out of the sump into a storage vessel. The interconnected hinged gates are counterbalanced to hold them in a normally upright position, but as oil is pumped from the housing the interconnected gates fall inwardly into the housing at a slight angle so that oil spills over the gates into the sump while also preventing excessive inflow of water. The housing has multiple compartments defined by the gates. Water is removed from the compartments through piping which communicates with the lower region of each compartment.

2 Claims, 2 Drawing Figures

PATENTED OCT 2 1973

JOHN W. PENTON,
INVENTOR.

BY

ATTORNEY.

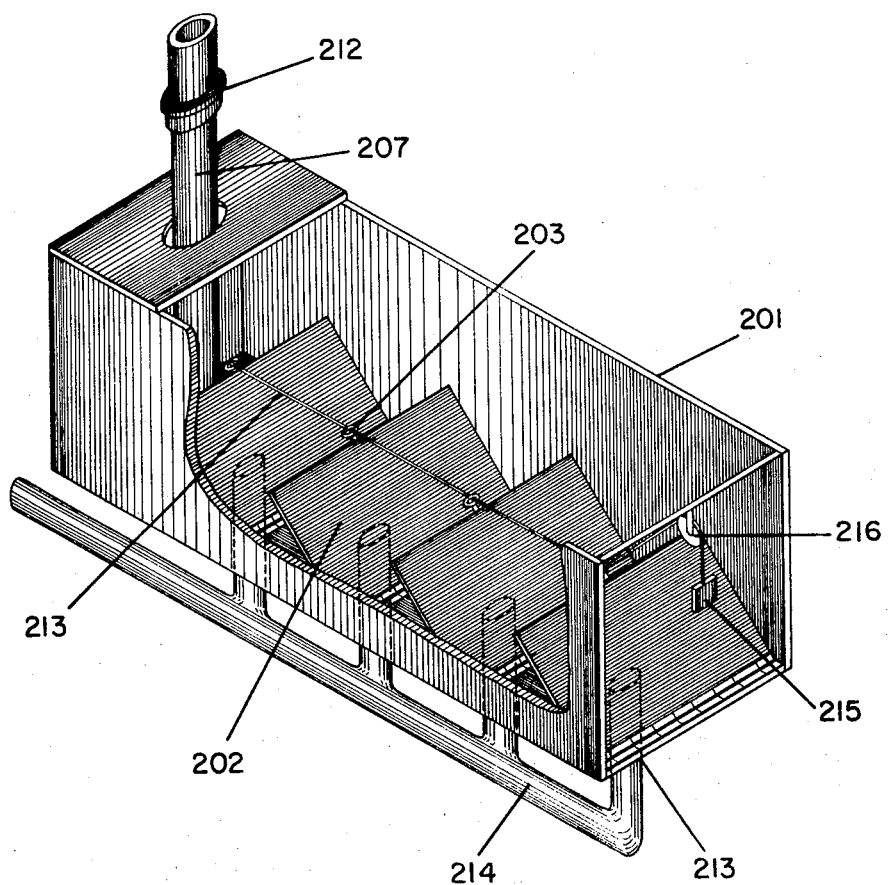

OIL SKIMMING APPARATUS

BACKGROUND OF THE INVENTION

This invention relates to the removal of oil slick contamination from a body of water. More particularly, the invention is an apparatus for the decanting of an oil slick which is accidently formed on a body of water during the production or refining of oil.

In the art of oil production and refinery engineering, a tremendous emphasis has been placed upon the requirement that the ecology of the areas surrounding the production and refining of the oil must not be detrimentally affected. One of the major problems which has developed within the oil industry is the contamination of bodies of water by oil slicks, i.e. a layer of oil on the surface of a body of water.

Many methods and arrangements of apparatus have been utilized in order to collect oil slicks so that ecological balance in the water and the surrounding area are protected. Oil slick removal methods include biological degradation of the oil through use of waste water treatment plants in which gravel beds containing bacteria are utilized to consume the hydrocarbons contained in the water, activated charcoal settling beds which physically remove the oil from the water by absorption, and mechanical apparatus such as oil skimmers.

A common form of a mechanical oil skimmer consists of a pump located on a floating platform. The suction portion of the pump is positioned a fraction of an inch below the surface of the body of water contaminated by the oil. The oil skimmer itself is positioned so as to be exposed to the greatest amount of oil accumulation formed by the wind, wave motion or other physical phenomena. By adjustment of the pump inlet a majority of the oil is removed from the water with a minimum removal of water therewith. An inherent problem with conventional oil skimmers is that definite quantities of undesirable water are removed with the oil slick, necessitating the use of an elaborate decanting or distillation scheme to separate the oil and water so that uncontaminated water may be returned to the water source.

What is required is a simple mechanical apparatus for removing an oil slick from a body of water. The apparatus should preferably be capable of automatically removing an oil slick from a body of water so that little physical separation is required to place the oil in a reuseable form while also returning the separated water to the body of water.

It is an object of the present invention to provide an apparatus for the separation of oil slicks from a body of the water.

It is a further object of the present invention to provide a mechanical apparatus which can be left unattended and will separate oil slicks from a body of water.

It is still another object of the present invention to provide an apparatus which can be constructed stationary or made so float so that removal of an oil slick from a body of water can be facilitated by placing the separation apparatus in the stationary position or by allowing the apparatus to float and follow the oil slick buildup.

SUMMARY OF THE INVENTION

The objects of the present invention are accomplished by novel apparatus for removing an oil slick from a body of water. The apparatus comprises a housing having sides and a bottom portion so that the housing is normally sealed from the body of water. A gate in one side of the housing is pivotally connected at its bottom portion to the housing. Counterweighting means are provided for positioning the gate so that is normally in an upright position but will move inwardly to allow the oil slick to decant over the gate when accumulated oil is removed from the housing. Pumping means for removing the accumulated oil from the housing are provided and can comprise a pump with its inlet positioned within the housing to contact and remove the oil slick contained therein.

BRIEF DESCRIPTION OF THE DRAWINGS

The present invention may be more fully understood by referral to the following drawings in which:

FIG. 2 illustrates another embodiment of the invention in which a series of gates are provided for decanting oil within the housing.

DETAILED DESCRIPTION OF THE INVENTION

Figure 1:
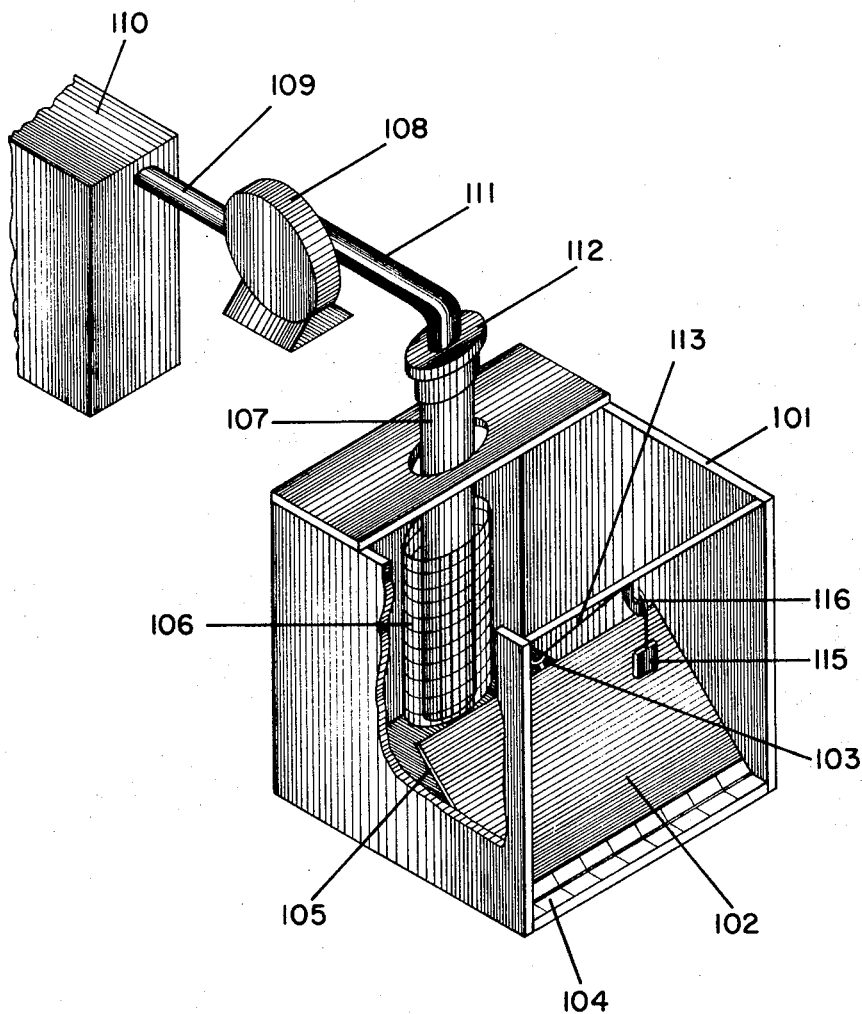
FIG. 1 shows a preferred embodiment of apparatus which contains a single gate for the decanting of the oil into the housing for oil accumulation.

The present invention has been found to be particularly applicable to the removal of oil slicks from settling ponds associated with oil production and oil refining processes. In one embodiment of the present invention described herein, a portion of one side of the housing is utilized as a weir. The weir comprises a gate which is pivotally connected at its bottom portion to the housing. The pivotal connection may be made by use of a hinge arrangement similar to a piano hinge. The gate may comprise all or a portion of one side of the housing. Means are provided for positioning the gate such that it is normally in an upright position so that no water or oil will be allowed to flow into the housing. Upon activation of means for removing accumulated oil from the housing, for example a pump with its inlet positioned at the depth of oil accumulated within the housing, the pivotable gate will move inwardly to allow the oil slick to decant over the top of the gate thus skimming the oil from the body of water and letting it flow into the housing. Upon activation of the pump to remove the accumulated oil from the housing, oil is decanted over the top of the gate to replenish the oil supply withdrawn from the oil sump or internal portion of the housing. The gate is constructed so that the sides thereof are mounted flush with the adjacent sides of the housing whereby no substantial lateral flow of water is allowed within the housing with the only flow occurring over the top of the gate. If desired, a seal may be made between the adjacent walls of the housing and the gate by placing a rubber material upon the interior of the adjacent walls and upon the sides of the gate so that a smooth union will occur therebetween.

In the application of the present invention the means for positioning the gate so that it is normally in an upright position and will only move inwardly when the pump is activated and oil is removed from the oil sump can comprise a counterweighting mechanism upon it so that the gate wil tend to float to the upright position when no unbalanced force is placed upon it. For instance, by use of a pulley attached to the top of the housing and a line connected to the top of the gate passing over the pulley and connected to a counterweight the inward movement of the gate will be controlled so that a preferred one thirty-second to 1 inch of oil flow occurs. An adjustable counterweight has been found to be especially suitable for this purpose. Therefore, under normal conditions when the pressure within and without the housing is equal, the gate will float to an upright position and not allow the accumulated oil within the housing to flow outward nor the body of water on the exterior of the gate to flow inward. When the pump is activated, accumulated oil is removed from the housing, causing an external force to be exerted by the higher level of water on the exterior of the gate and causing it to move inwardly. The amount of inward movement of the gate is controlled so that the preferred one thirty-second to 1 inch of flow is allowed across the top thereof. By controlling the gate movement, only the oil floating upon the body of water is allowed to flow over the gate while water flow thereover is restricted.

The apparatus may further comprise means for removing accumulated water from the housing. The means for removing the accumulated water from the housing may consist of a pump with its inlet positioned in the lower portion of the housing or a valve positioned in the bottom of said housing which may be mechanically manipulated so the water may be drained from the housing and returned to the water source. Means can also be provided for automatically activating the means for removing the accumulated oil and the means for removing the accumulated water from the housing. The apparatus can be specifically constructed so that it can be maintained in a stationary position or constructed of a buoyant material so that it can float and be freely moved upon the body of the water.

To more fully appreciate the present invention, reference may be had to FIG. 1 in which an embodiment of the apparatus of the present invention is depicted. Housing 101 has four sides and a bottom and is equipped with a gate 102 which forms a substantial part of one side thereof. The gate 102 is pivotally connected at its bottom to the housing 101 by hinge 104 such that the gate 102 is mounted flush with the adjacent walls 105 of the housing 101. Connected to the upper portion of gate 102 is an eye-hook 103. A wire line 113 connects the eye-hook 103 to a counterweight 115, which balances the gate 102 in a normally upright position by passing wire line 113 over pulley 116. Therefore, when the housing and exterior portion of the housing are submerged in a fluid such as water, the gate is normally positioned in an upright fashion. Provided within the housing is a suction tube or siphon 107 having a quick release union 112 upon which may be attached pump hose 111 such that fluid contained within the housing 101 may be pumped through siphon 107, union 112, pump hose 111, pump 108, storage line 109 and into storage reservoir 110. Axially positioned about siphon 107 may be a screen or mesh material 106 to prevent large entrained particles from contaminating the flow through siphon 107.

In the typical operation of the apparatus depicted in FIG. 101, the gate 102 is initially in an upright position. When the pump 108 is started, there is a suction produced within the housing which forces the body of water exterior to housing 101 against gate 102 pushes inwardly, and by control of the weight of the counterweight 115, wire line 113, passing over pulley 116 and attached to the gate 102 by eye-hook 103, from about one thirty-second to about 1 inch of oil slick is allowed to decant into housing 101. This oil is picked up through siphon 107 and pump line 111 and conveyed through pump 108 and reservoir line 109 into storage reservoir 110, thereby removing the oil slick from the body of water and accumulating it in an easily moveable storage container. The apparatus described in FIG. 1 can be permanently positioned in a stationary manner as by extending legs from the housing and sinking them to the floor of the body of water. Alternatively, the apparatus can be constructed of a buoyant material such as wood so it can float and be moved freely about the body of water, thereby being positionable about the body of water in those locations where a heavy oil slick buildup has formed. A valve can be placed in the lower portion of the housing to allow the removal of water. In operation, this valve can be automatically manipulated by connecting it to a float which opens the valve when a predetermined water level is obtained.

Referring to FIG. 2, a cascade type apparatus is depicted for the removal of an oil slick from a body of water. To yield a cascade effect, the housing 201 contains several gates 202 positioned therein. As in FIG. 1, the gates 202 are positioned so that the sides thereof are mounted flush with the sides of housing 201. Also positioned in the bottom portion of the oil skimming apparatus is a siphon 207 connected to a quick release hose connection 212. In operation of the cascade oil decanting apparatus, eye-hooks 203 positioned on the top of gates 202 are connected to wire line 213, which passes over pulley 216 and is affixed to counterweight 215, so as to normally position the gates 202 in an upright position. When fluid is removed by siphon 207, the gates 202 are pulled inwardly, to allow an oil slick to decant over each gate 202. When oil is removed through siphon 207, oil and a small amount of water are pulled over the first gate, but as it passes over subsequent gates the oil portion becomes richer in oil with the water cut falling to the bottom of each baffled chamber and removed through drain 213 and drain line 214. Therefore, at the exit portion of the housing the pump removes almost pure oil from the last compartment with water being removed from the lower portions of the other compartments.

In construction of the housing and other materials of the present invention any construction materials which will resist the corrosiveness of water and withstand endured usage can be utilized. Typical materials of construction include wood, aluminum, stainless steel and other materials which have sufficient rigidity and can be easily fabricated. The counterweight material may consist of high density materials such as iron, lead, or other suitable materials, although it is preferred that the counterweight material be non-corrosive. This weight can be adjusted for various levels of water contained within the pond, should the housing be stationary, such that the gate will always allow the preferred one thirty-second to 1 inch overflow across the top thereof. Should a floating apparatus be required so that it can be multipositioned about the body of water, the housing can be constructed of any buoyant material such as the wood or polystyrene and these materials can also be used for flotation of the gate.

The present invention as described herein allows the exact decanting of an oil slick from a body of water so that the oil can be removed and the water placed in an uncontaminated condition. It is understood that various embodiments of the present invention exist outside of those disclosed and it will be appreciated that various modifications and changes can be made without departing from the scope of the invention defined in the following claims.

Therefore, I claim:

1. A floatable oil skimmer comprising:
   a. a housing having sides and a bottom normally sealed from a body of water in which the housing is positioned for use, said housing being floatable on said body of water,
   b. pumping means for removal of oil from said housing, said pumping means being in communication with a body of liquid that accumulates within said housing during removal of an oil slick from said body of water,
   c. a hinged gate which forms at least a portion of one of the sides of said housing and pivotally connected at a lower edge thereof to swing inwardly into the housing upon removal of oil therefrom by the pumping means,
   d. additional hinged gates within said housing pivotally connected at lower edges thereof to swing inwardly into the housing upon removal of oil therefrom by the pumping means, the gates being parallel to one another,
   e. multiple compartments within said housing which are defined by said hinged gates,
   f. water removal piping in communication with the lower region of each of said multiple compartments,
   g. a pulley mounted on an upper portion of the housing, a line which passes over said pulley, the top edge of each of the aforesaid gates being attached to the line toward one end thereof, and counterweighting means attached to the other end of the line.

2. The apparatus of claim 1 wherein the weight of the counterweighting means is adjustable.

* * * * *